(12) United States Patent
Deàk et al.

(10) Patent No.: US 10,291,086 B2
(45) Date of Patent: May 14, 2019

(54) AXIAL FLUX MOTOR FOR MOTOR VEHICLE

(71) Applicant: Baumueller Nuernberg GmbH, Nuremberg (DE)

(72) Inventors: Csaba Zsoltk Deàk, Nuremberg (DE); Hans-Juergen Brauneiser, Fuerth (DE); Robert Schieck, Nuremberg (DE); Frank Gutjahr, Etzelwang (DE)

(73) Assignee: Baumueller Nuernberg GmbH, Nuremberg (DE)

( * ) Notice: Subject to any disclaimer, the term of this patent is extended or adjusted under 35 U.S.C. 154(b) by 219 days.

(21) Appl. No.: 15/364,958

(22) Filed: Nov. 30, 2016

(65) Prior Publication Data

US 2017/0155291 A1 Jun. 1, 2017

(30) Foreign Application Priority Data

Nov. 30, 2015 (DE) .......................... 10 2015 223 766

(51) Int. Cl.
| | |
|---|---|
| *H02K 1/18* | (2006.01) |
| *H02K 21/24* | (2006.01) |
| *H02K 1/14* | (2006.01) |
| *H02K 9/22* | (2006.01) |

(52) U.S. Cl.
CPC .............. *H02K 1/182* (2013.01); *H02K 1/148* (2013.01); *H02K 21/24* (2013.01); *H02K 9/22* (2013.01)

(58) Field of Classification Search
CPC ........ H02K 1/148; H02K 1/182; H02K 21/24; H02K 9/22
See application file for complete search history.

(56) References Cited

U.S. PATENT DOCUMENTS

| | | | | |
|---|---|---|---|---|
| 4,547,714 A * | 10/1985 | Muller | ................... | H02K 29/08 310/68 R |
| 4,684,840 A | 8/1987 | Bertram et al. | | |
| 6,211,596 B1 * | 4/2001 | Freise | ................... | H02K 1/243 310/263 |
| 7,638,919 B2 * | 12/2009 | Pulnikov | ................ | H02K 1/145 310/156.02 |
| 2011/0316381 A1 | 12/2011 | Asano et al. | | |
| 2012/0126653 A1 | 5/2012 | Yang et al. | | |
| 2013/0140920 A1 | 6/2013 | Wei et al. | | |
| 2014/0265738 A1 * | 9/2014 | Anderson | ............... | H02K 7/116 310/60 R |
| 2015/0013636 A1 * | 1/2015 | Boese | ................... | F01L 1/3442 123/198 E |
| 2016/0072362 A1 * | 3/2016 | Kube | ...................... | H02K 7/14 310/67 R |

FOREIGN PATENT DOCUMENTS

| | | |
|---|---|---|
| DE | 34 23 777 C2 | 1/1988 |
| DE | 10 2010 036 828 A1 | 2/2012 |
| DE | 10 2010 064 173 A1 | 6/2012 |
| EP | 2 787 610 B1 | 7/2015 |
| FR | 2 851 088 A1 | 8/2004 |

* cited by examiner

*Primary Examiner* — Emily P Pham
(74) *Attorney, Agent, or Firm* — Muncy, Geissler, Olds & Lowe, P.C.

(57) ABSTRACT

An electrical machine, in particular an axial flux motor, with a rotor, mounted rotatably about a machine axis, and with a stator. The stator has a sintered support structure and an insert connected thereto, which forms at least partially a pole shoe, and which comprises a lamination stack.

18 Claims, 7 Drawing Sheets

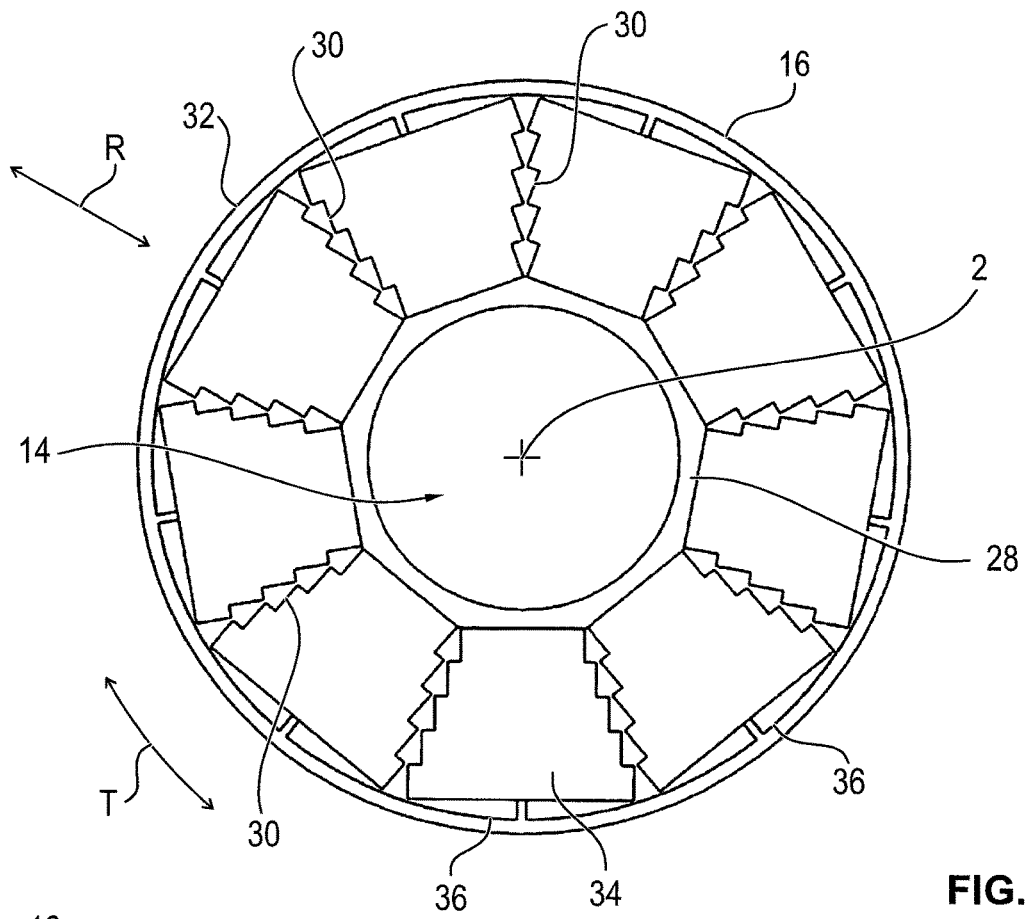
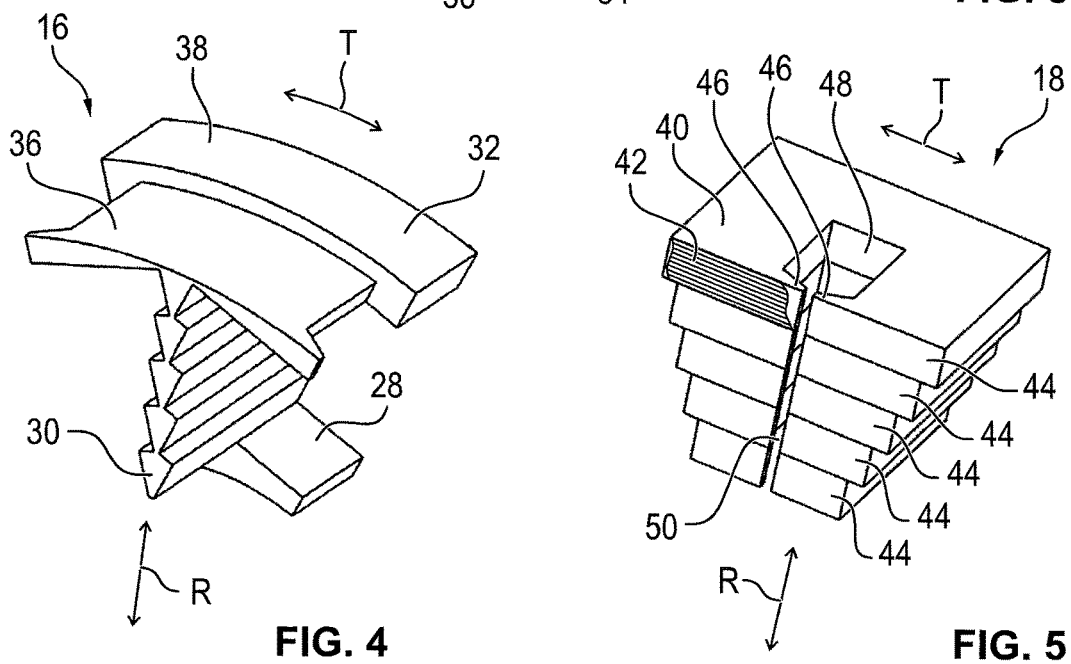
FIG. 3
FIG. 4
FIG. 5

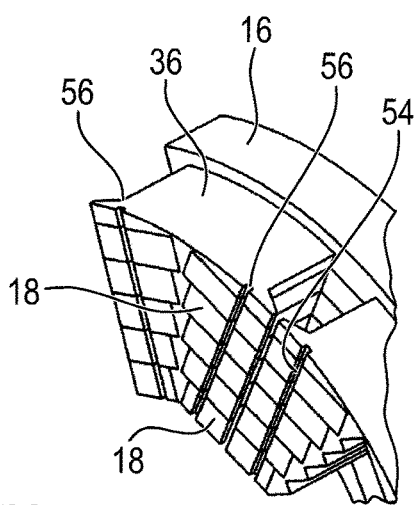 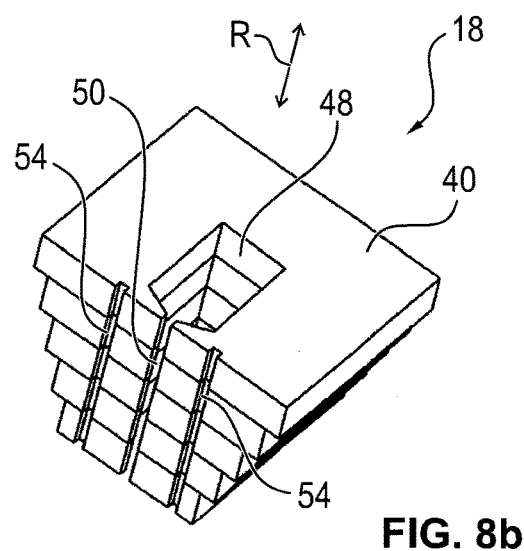
FIG. 8a  FIG. 8b
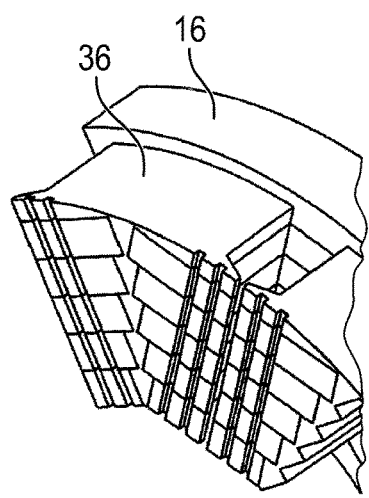 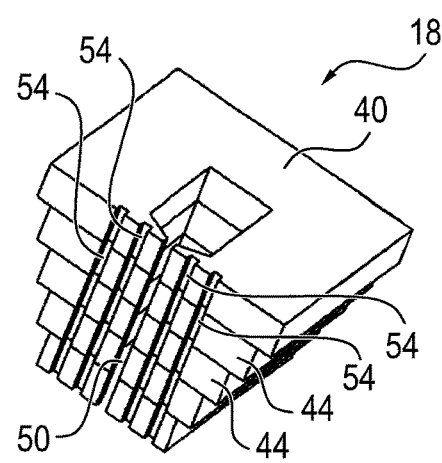
FIG. 9a  FIG. 9b
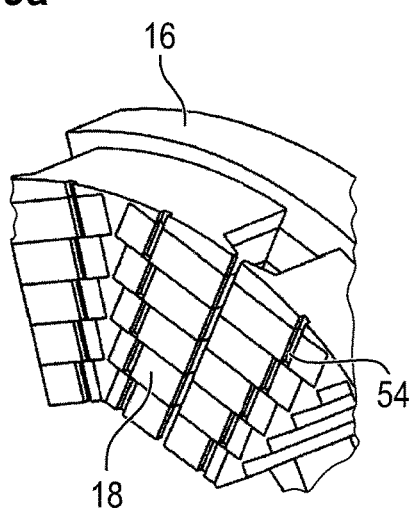 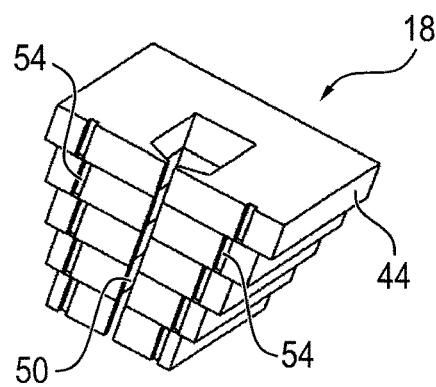
FIG. 10a  FIG. 10b

AXIAL FLUX MOTOR FOR MOTOR VEHICLE

This nonprovisional application claims priority under 35 U.S.C. § 119(a) to German Patent Application No. 10 2015 223 766.4, which was filed in Germany on Nov. 30, 2015, and which is herein incorporated by reference.

BACKGROUND OF THE INVENTION

Field of the Invention

The invention relates to an electrical machine with a rotor, mounted rotatably about a machine axis, and with a stator. The electrical machine is in particular an axial flux motor.

Description of the Background Art

Motor vehicles are being increasingly powered by electric motors, which are designed, for example, as wheel hub motors. To increase motor vehicle efficiency and dynamics, it is necessary that the electric motors are designed to be relatively compact and to have a relatively low weight. So-called axial flux motors are particularly suitable for this. These typically have a number of electrical windings, which are arranged parallel to the rotor's rotation axis and around it with the formation of a gap. A magnetic field parallel to the rotation axis is produced by the electrical windings, whereby the particular magnetic pole is spaced apart from the rotation axis and extends in the axial direction. It acts together with the permanent magnets, comprising the rotor, which is generally arranged in the axial direction in front of the stator comprising the electrical windings. In this regard, none of the electrical coils have a winding head, for which reason all winding elements are used to generate the magnetic field driving the rotor. In the case of an axial flux motor, a relatively fine pole pitch is realizable, so that the rotor can also be operated with a relatively low speed and a relatively large torque, which is a use profile of a wheel hub motor. No gears are necessary for this, which reduces friction losses, on the one hand, and weight, on the other. Manufacturing costs are also reduced in this case.

In comparison with radial flux motors, which have a number of electrical windings which are arranged perpendicular to the rotation axis and by means of which a magnetic field oriented in the radial direction is provided, the design of the stator is relatively complex, however. For this purpose, typically the winding-bearing part of the stator is produced by a sintering process, for which purpose ferrite powder is generally pressed into a suitable mold. In this way, forming of the desired magnetic field is relatively precise and the production is also relatively cost-effective. However, the electrical machine provided with a stator of this type has reduced magnetic properties particularly in the low-frequency range, for which reason efficiency is reduced. As a result, a larger stator is necessary to achieve a specific performance. Moreover, the mechanical integrity of the stator is relatively low.

An alternative is the winding of the stator comprising band strips made of electrical sheet, which is rolled up in a spiral form. Because the recesses, which form the later stator slots, must be present even before the winding process, and because the radius and consequently the tangential gap between adjacent recesses, forming the later slots, increase with an increasing radius, it is necessary that the band strip is fabricated adapted to the electric motor. In other words, the gap must always be determined anew between each punching. Because there always is play during the rolling to form the stator, the individual recesses are not completely aligned, for which reason a cost-intensive post-processing of the stator is necessary for realizing relatively low fabrication tolerances.

SUMMARY OF THE INVENTION

It is therefore an object of the invention to provide an especially suitable electrical machine, in particular an axial flux motor, and an especially suitable stator of an electrical machine of this kind, whereby in particular the manufacturing costs and/or fabrication tolerances are reduced, and whereby the magnetic properties and consequently efficiency are expediently increased.

In an exemplary embodiment, the electrical machine has a rotor, mounted rotatably about a machine axis, and a stator. The electrical machine can be a synchronous machine and can be designed as a brushless DC motor. Expediently, the electrical machine can be an axial flux machine, whereby, for example, a magnetic field, extending parallel to the machine axis, is produced during operation by the stator. The electrical machine can be, for example, a generator, but particularly preferably an electric motor, and in particular an axial flux motor. The electrical machine is used particularly preferably in a motor vehicle and is preferably used for powering the motor vehicle.

The stator has a sintered support structure, which is produced particularly preferably from a powdered, soft-magnetic material. The material is particularly preferably a composite and has, for example, a ferrite powder or formed thereof. In other words, the support structure is ferromagnetic. The stator further has an insert which is connected to the support structure. For example, the insert is fastened to the support structure, for example, by means of an adhesive. Particularly preferably, a positive and/or frictional connection, by means of which the insert is connected to the support structure, is created at least partially between the insert and the support structure. The insert itself forms at least partially a pole shoe of the electrical machine. In other words, the magnetic field produced during operation is formed at least partially, in particular bundled, by means of the pole shoe, whereby preferably a permanent magnet of the rotor interacts with the pole shoe.

The insert itself comprises a lamination stack and is formed particularly preferably thereof. The lamination stack is formed by individual layers, stacked one above the other, on individual metal sheets (electrical sheets), which are made of, for example, a soft iron. The individual sheets are insulated electrically from the adjacent sheet and in particular connected to one another. In summary, the stator has a hybrid structure, which is formed from the sintered support structure and the insert having the lamination stack.

It is possible because of the sintered support structure to realize a relatively complex geometry of the magnetic field to be produced, for which a suitable press mold is used for producing the support structure. Because of the insert having the lamination stack, in this respect efficiency is increased in comparison with fabrication of the stator solely by a sintering process. The lamination stack can have a relatively geometrically simple form, which reduces production costs. Consequently, there is a splitting of the configuration of the magnetic field, whereby the complex configuration of the magnetic field occurs by means of the support structure and an improved efficiency by means of the insert. In this case, expediently magnetic field regions that are relatively simple to form are formed by the lamination stack of the insert.

In particular, the lamination stack comprises a number of sheet stacks, for example, two, three, or more. For example, the lamination stack has less than ten, nine, or eight such sheet stacks. Preferably, the lamination stack comprises five sheet stacks. The individual sheet stacks of the lamination stack itself are stacked one on top of another in the radial direction and in particular connected to one another, whereby welding, gluing, or punch-stacking is used expediently. Each sheet stack is made of individual metal sheets, which have the same shape. In particular, each sheet stack comprises at least five, ten, or fifteen metal sheets. For example, each sheet stack has less than a hundred, ninety, or eighty individual sheets. Preferably, the number of sheets in each sheet stack is the same.

The individual sheets in each sheet stack are stacked one on top of another in the radial direction, whereby the sheets in each sheet stack are connected to one another by gluing, welding, or punch-stacking. In other words, the plane within which the particular sheet is arranged is perpendicular to the radial direction.

The sheets of the different sheet stacks differ. In other words, the lamination stack has a number of different sheet types that corresponds to the number of sheet stacks, similar sheets being combined into one of the sheet stacks. As a result, the lamination stack is adapted to magnetic and/or geometric requirements, whereby nevertheless use of identical parts is made possible which reduces production costs.

For example, the sheets are configured to be U-shaped, whereby the design of at least one of the legs of the U-shape of the sheets differs among the individual sheet stacks. In particular, the central recess of the individual sheets is of the same size, and the individual sheets of the lamination stack are aligned in this region. Alternatively or in combination, the area of the sheets is increased with increasing distance to the machine axis. In other words, with increasing distance to the machine axis each sheet stack has an increased tangential extent. In this regard, the sheets of each sheet stack are furthermore also fabricated to be similar, for which reason the area of the sheets of the sheet stacks is increased substantially in steps with an increasing distance to the machine axis. In other words, the cross section of the lamination stack perpendicular to the machine axis is designed substantially in the shape of a triangle or circle segment, for which reason a relatively large cross section of the stator is created perpendicular to the machine axis by the lamination stack. The efficiency of the electrical machine is increased in this way.

The lamination stack can be arranged axisymmetrically relative to a radial straight line, so that the magnetic field formed by the lamination stack has no preferred direction in the tangential direction. Provided the sheet stacks have an increased tangential extent with an increasing distance to the machine axis, the cross section of the lamination stack perpendicular to the machine axis consequently has a stepped limit in the tangential direction.

In other words, the lamination stack edge running in the radial direction can be formed as steps, for which reason the cross section of the lamination stack perpendicular to the machine axis is designed substantially in the shape of a fir tree.

The insert can have a radially extending stator slot. In particular, the lamination stack comprises the radially extending stator slot, whereby it is created, for example, by a cylindrical recess in the lamination stack. Expediently, the sheets of the lamination stack are formed substantially U-shaped, whereby the stator slot is created by the central recess in each sheet. To this end, the sheets of the lamination stack are expediently aligned in the area of the central recess. In other words, the region formed between the individual legs of each sheet is of similar size. Expediently, each insert has only one stator slot, for which reason there is relatively little waste during the production of the lamination stack, on the one hand. On the other hand, a relatively complicated punch geometry is not necessary to create the particular sheet.

For example, the insert has a radially extending slit which opens into the stator slot. In particular, the lamination stack has both the slit and the stator slot. The slit i has a reduced tangential extent n comparison with the stator slot, so that the stator slot is circumferentially surrounded with the exception of the region formed by the slit. For example, the cross section of the stator slot perpendicular to the tangential direction is pentagonal in shape, whereby one of the corners is formed by the slit. Expediently, the stator slot, in particular the slit, if it is present, runs over the complete radial extent of the lamination stack. Consequently, the magnetic field is formed by the lamination stack, whereby the production costs of the lamination stack are relatively low. In particular, the lamination stack has the number of sheet stacks. Thus, in fact different sheets are necessary to create the lamination stack. These, however, have a relatively small area, and a correction of the individual sheets relative to one another can occur during the stacking, for which reason fabrication tolerances can be selected as relatively small. In other words, each sheet can be oriented substantially independently to the other sheets.

For example, the insert can have a radially extending recess, in particular a number of such recesses, for example, two, three, or four. The radially extending recess extends expediently in the radial direction along the entire length of the insert. Suitably, the lamination stack has the radially extending recess. Provided the lamination stack comprises the individual sheet stacks, each of the sheet stacks expediently has a section of the radially extending recess. These align, for example, with one another or are offset to one another in the tangential direction. For example, the recess is made groove-shaped, therefore open on one side, whereby the opening is expediently at the axial end. The introduction of the recess into the insert is simplified in this way. Expediently, the insert has both the radially extending stator slot and the radially extending recess. The cross section of the radial recess perpendicular to the radial direction in this case is preferably smaller than the cross section of the stator slot. For example, the cross section of the radial recess is smaller than half, a tenth, a fifth, 5%, or 1% of the cross section of the stator slot. A homogeneity of the magnetic field is at least partially eliminated by the radial recess, for which reason the rotor cogging torque is reduced, in particular if the electrical machine is a permanently excited synchronous machine. Consequently, it is made possible to fabricate the stator substantially symmetrically, whereby nevertheless cogging torques are reliably prevented. Therefore, production of an electrical winding of the stator by a winding machine is also made possible.

Alternatively or in combination, the insert can be intermeshed with the support structure. In this case, the insert and the support structure can have a stepped or tooth structure corresponding to one another. Expediently, the insert has the lamination stack having a number of sheet stacks. In this respect, the lamination stacks are arranged to one another such that an edge of the lamination stack is formed in steps. Preferably, the lamination stack is formed in the shape of a fir tree, whereby both sides of the lamination stack abut a corresponding element of the support structure. A positive connection is created in this way between the support structure and the insert, which facilitates assembly.

For example, the insert projects in the axial direction through the support structure. In other words, a section of the insert is surrounded circumferentially at least partially by the support structure. The insert has two further sections, which are positioned in the axial direction on different sides of the support structure. Thus, because of the increased permeability of the insert in comparison with the support structure, a relatively pronounced magnetic field is provided, whereby a detaching or tilting of the insert relative to the support structure is substantially prevented.

Expediently, the insert on the front side abuts a cooling plate. In other words, the cooling plate is arranged in the axial direction at one end of the insert. Preferably, the insert is connected to the cooling plate, which increases mechanical robustness. Expediently, the insert is contacted thermally with the cooling plate. Preferably, a direct mechanical contact is created between the insert and the cooling plate. The cooling plate suitably has a number of fins or a coolant line. Removal of the dissipated heat from the insert is enabled by the cooling plate, which increases the efficiency of the electrical machine. The insert section located on the remaining side of the support structure is not influenced substantially by the cooling plate, so that a relatively pronounced magnetic field is produced by this section. In particular, the rotor is located on the support structure side opposite to the cooling plate in the axial direction.

For example, the section of the insert, projecting through the support structure, is narrowed in the tangential direction. In other words, this section has a reduced extent in the tangential direction. Expediently, the cooling plate abuts this section on the front side. Consequently, a reduced amount of material is required for producing the insert. In particular, provided the rotor is disposed on the remaining side of the support structure, the narrowed section is used substantially for removing the heat, whereby because of the remaining section of the insert the magnetic field is not substantially influenced. Expediently, the lamination stack abuts the cooling plate and/or is narrowed in the tangential direction.

For example, the support structure is designed as a single piece. Preferably, however, the support structure has a number of separate segments, which in particular are similar and/or preferably designed as sectors. Expediently, the support structure is formed of the segments. The segments are in particular a single piece. The segments are arranged, for example, rotationally symmetric to one another. In other words, each segment has substantially a circular segment-like cross section or is disposed at least within such a sector. The individual segments are arranged in the tangential direction and preferably connected to and/or placed against one another. Expediently, the segments are fastened to one another, for example, by a positive and/or frictional connection, for which reason these preferably have suitably shaped overlappings. Alternatively or in combination, fastening means, such as screws, bolts, or adhesive are used. Because the support structure is fabricated from individual separate segments, it is made possible to create a relatively large stator, whereby the press mold used for producing the sintered segments is relatively small. Reduced force is also necessary for producing the individual segments, which reduces the production costs further.

Alternatively or in combination, a flange is attached on the front side to the support structure. For example, the support structure on the front side is covered at least partially by the flange, which is designed, for example, as disc- or ring-shaped. In particular, the flange is fabricated of an aluminum, therefore of pure aluminum, or an aluminum alloy. The support structure is stabilized by the flange, so that the mechanical integrity of the electrical machine is increased. Expediently, the cooling plate is present in this case, whereby the flange is preferably disposed between the cooling plate and the support structure. Provided the insert projects through the support structure, the flange preferably has an opening corresponding hereto, whereby the flange suitably abuts substantially positively the section projecting through the support structure. Expediently, in this case, the section of the insert is narrowed in the tangential direction, for which reason the flange can be made more robust in comparison with the support structure, which increases the mechanical stability of the electrical machine further. The flange is preferably an element of a housing, within which the stator is placed. For example, the flange is formed by an end shield of the housing. Preferably, the flange is a single piece with other elements of the housing, which simplifies manufacturing.

For example, the support structure has an inner ring and an outer ring. The inner ring and outer ring are preferably arranged concentrically to one another and to the machine axis, and overlap expediently in the axial direction at least in sections, preferably substantially completely. The overall size of the electrical machine is reduced in this way. The inner ring and outer ring are connected by at least one rib, preferably a number of ribs. The rib(s) expediently run(s) in the radial direction, so that substantially only forces in the radial direction need to be absorbed by it (them). Provided the support structure is made of a number of segments, each segment has at least one of the ribs, in particular precisely one of the ribs that connect a segment of the inner ring to a segment of the outer ring. Preferably, the rib is disposed on an axis of symmetry of the segment. In other words, each segment is made substantially axisymmetric. Assembly is facilitated in this way.

Preferably, the insert is positioned in the tangential direction between two of the ribs and expediently abuts the two ribs at least in sections. Suitably, a positive and/or frictional connection is created between the rib and the insert, in particular the lamination stack. For example, the insert or the lamination stack is intermeshed with the rib. Suitably, the insert is disposed in the radial direction at least partially between the inner ring and outer ring. The insert is positioned relatively stably in this way. In this respect, a relatively pronounced portion of the magnetic field created by the stator is borne by the insert, which increases the efficiency. Expediently, in this respect, the insert projects through the support structure. Provided the insert has the radial recess or the slit opening into the stator slot, these are located preferably on the insert side facing away from the inner and outer ring, so that the changes in the magnetic field as created by the radial recess or the slit are substantially not influenced by the two rings.

Preferably, the insert abuts the inner ring and outer ring at least in sections. In other words, a direct mechanical contact is created between the insert and the two rings, in particular between the two rings and the lamination stack. Forming of the magnetic field is simplified in this way and there is no air gap or the like, by means of which the field lines of the magnetic field would be formed unsuitably. The position of the insert relative to the support structure is also stabilized due to the direct mechanical contact, so that the electrical machine is relatively robust.

The outer ring can have a cover, which is shaped as a shell segment and covers the insert in the radial direction, in particular over its entire axial length, at least in a direction relative to the outer ring. In particular, the cover covers the lamination stack. Preferably, the shell-segment-shaped cover extends in the axial direction. The insert is stabilized by the cover, so that robustness is increased. The cross section of the shell-segment-shaped cover in particular has the shape of a crescent or circular segment. Preferably, the insert, in particular the lamination stack, lies on the cover, which is formed curved radially outward. Expediently, the cover has a number of recesses/openings, which are aligned in particular with corresponding elements of the insert, such as the stator slot or the radially extending recess, provided these are present. Suitably, the stator comprises an electrical winding, preferably a number of electrical windings. In particular, the number of electrical windings is the same as the number of inserts.

The electrical winding is preferably wrapped partially around the shell-segment-shaped cover in sections. In other words, the electrical winding abuts against the cover. Due to the rounding of the cover, damage to the electrical winding is substantially ruled out during production of the stator and during operation of the electrical machine. The electrical winding itself is produced, for example, from an enameled copper wire. Preferably, the electrical winding lies partially in the stator slot, if this is present. Suitably, two electrical windings are arranged at least partially within the stator slot.

Expediently, the stator has a number of similar inserts which are produced in particular as identical parts. In other words, the lamination stacks of the individual inserts do not differ. Preferably, the electrical machine comprises the same number of pole shoes as inserts. In this case, for example, one of the pole shoes is formed by each insert, or particularly preferably the halves, facing one another, of two adjacent inserts form at least partially one of the pole shoes. In other words, the pole shoes are bounded in the tangential direction in particular by the stator slots, if these are present. For example, each pole shoe is associated with one of the electrical windings, whereby the associated electrical winding lies at least partially in the stator slots bounding the particular pole shoe.

The support structure is preferably produced by separate segments. In this way, the stator has a number of components, which have a relatively small spatial extent. Therefore, on the one hand, storage and, on the other, assembly are simplified. For example, the electrical machine has two rotors, which surround the stator in the axial direction. Alternatively, the rotor is arranged at least partially circumferentially relative to the stator. Particularly preferably, however, the electrical machine has only a single rotor, which is positioned preferably on the front side of the stator. In this case, the rotor is arranged expediently on the side, opposite to the cooling plate, of the support structure, provided the cooling plate is present.

The stator can be a component of an electrical machine, in particular, an axial flux machine. The stator has a sintered support structure, which is made, for example, of a ferromagnetic material, in particular, iron powder. An insert, which forms at least partially a pole shoe and comprises a lamination stack, which is created preferably from a number of sheet stacks, is attached to the support structure.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows the support structure in a plan view;

FIG. 4 shows perspectively a separate segment of the support structure;

FIG. 5 shows perspectively an insert with a lamination stack;

FIGS. 8A, 8B each show perspectively a further embodiment of the insert and the support structure adapted thereto;

FIGS. 9A, 9B, 10A, 10B, 11A, and 11B each show according to FIGS. 8A, 8B further embodiments of the support structure and the insert;

DETAILED DESCRIPTION

Figure 1:
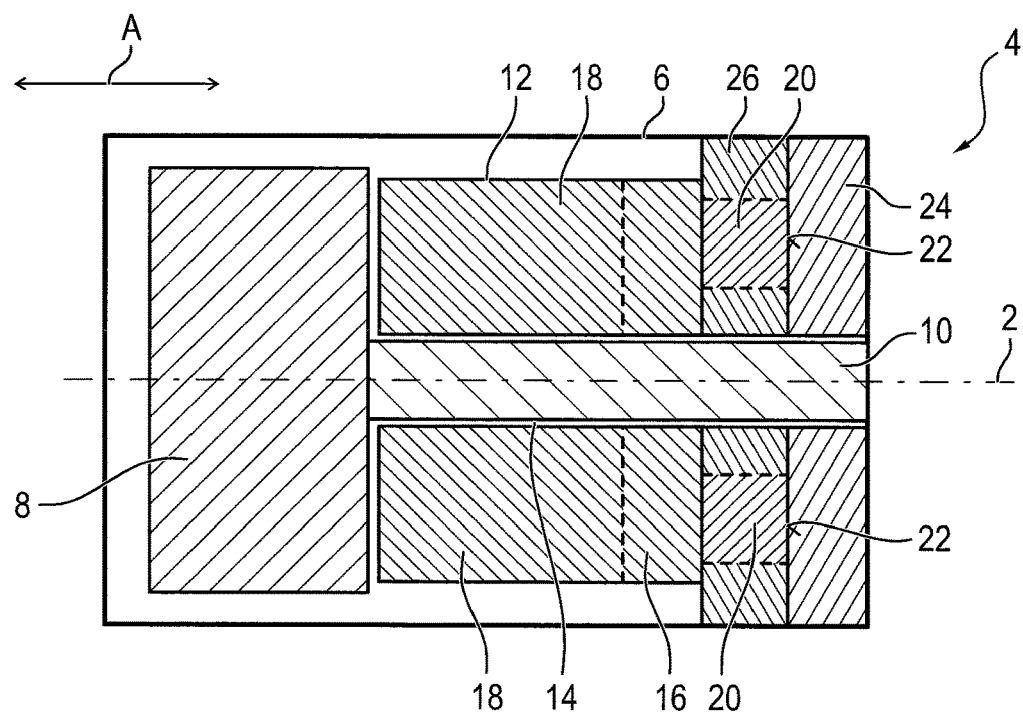
FIG. 1 shows schematically in a sectional illustration an axial flux motor with a stator.

An electrical machine 4, which is an axial flux motor and which in the assembled state is used for propelling, for example, a motor vehicle, is shown in FIG. 1 in a sectional illustration along a machine axis 2. Electrical machine 4 has a housing 6, within which a rotor 8 is positioned, which is mounted rotatably about machine axis 2 and is connected to a shaft 10. Rotor 8 is designed substantially cylindrical and is disposed concentric to machine axis 2 and to shaft 10. Shaft 10 and rotor 8 are supported by bearings (not shown in greater detail), for example, ball bearings. Shaft 10 is brought out of housing 6, for which the shaft has a journal (not shown in greater detail). Motor vehicle components to be driven, such as a wheel, are connected or at least operatively connected to it.

Electrical machine 4 further has a stator 12 with a central opening 14, within which shaft 10 is disposed, and which runs parallel to machine axis 2. In other words, stator 12 is designed substantially cylindrical or as a hollow cylinder and is arranged concentric to machine axis 2, whereby rotor 8 is located on a front side of stator 12. In this way, electrical machine 4 is relatively compact, whereby tilting of rotor 8 is substantially ruled out. Electrical machine 4 in the variant shown here only has a single rotor 8. A magnetic field, which is configured parallel to machine axis 2 at least in the area of shaft 10 and interacts with permanent magnets of rotor 8 (not shown in greater detail), is produced by stator 12 during operation. For this purpose, stator 12 is supplied with current by an inverter (not shown in greater detail).

Stator 12 has a support structure 16 and a number of inserts 18, which are attached to support structure 16 and project through an axial direction A. The particular section 20 of each insert 18, which projects through support structure 16 and consequently is located on the side opposite to rotor 8, abuts with the particular front side 22 of a cooling plate 24 and is in thermal contact with it. A one-piece flange 26, which is fastened to support structure 16 and cooling plate 24 and is also designed to be ring-shaped with the exception of the recesses for section 20, is located between support structure 16 and ring-shaped cooling plate 24, arranged perpendicular to machine axis 2. Flange 26 is made of an aluminum and is an element of one-piece housing 6.

Figure 2:
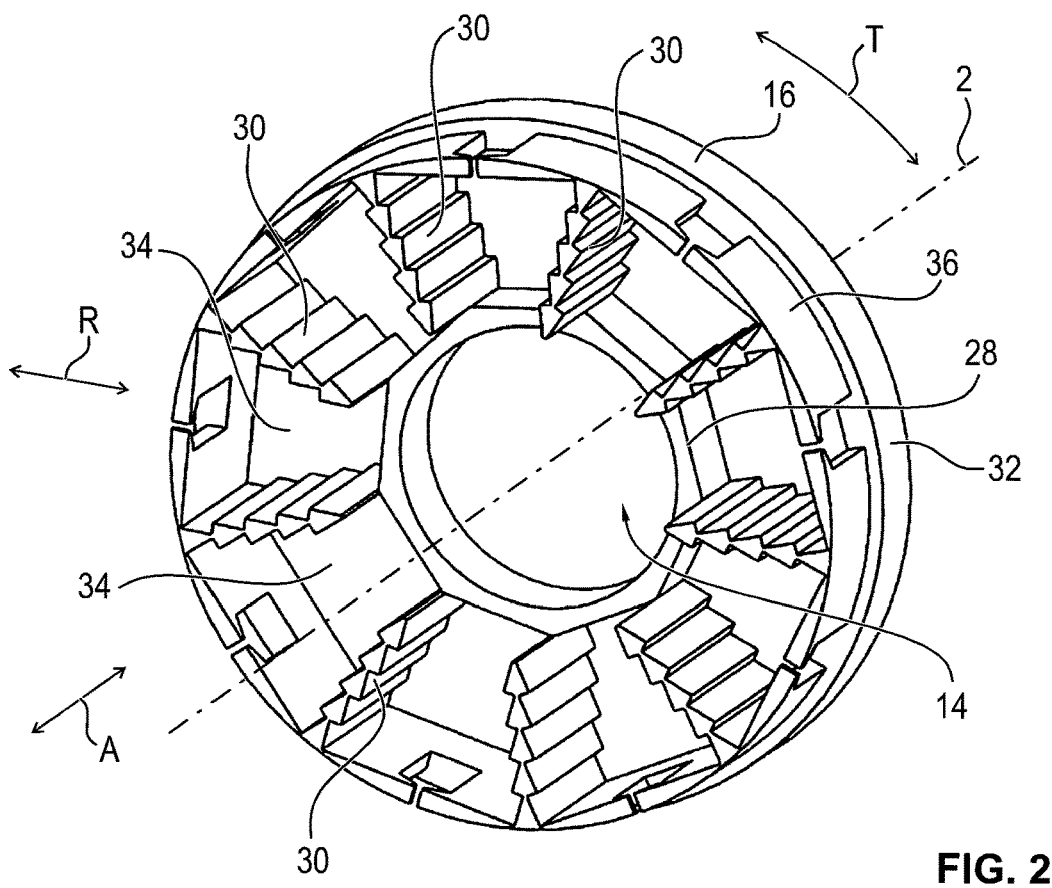
FIG. 2 shows perspectively a support structure of the stator.

Support structure 16, which is made of a sintered, powdered soft-magnetic material composite, which contains, for example, iron powder, is shown perspectively in FIG. 2 and in a plan view in FIG. 3. Support structure 16 is arranged concentric to machine axis 2, which is parallel to an axial direction A, and thus surrounds it in radial direction R. Radial direction R is understood to be in particular a direction that is perpendicular to axial direction A and is directed toward machine axis 2 or away from it. Support structure 16 has an inner ring 28, which surrounds central opening 14. Inner ring 28 itself has on its radial inner side a surface which is circular in shape, whereas the outer periphery of the cross section of inner ring 28 is formed perpendicular to machine axis 2 by a regular nonagon. A rib 30, which runs in radial direction R, is positioned at each corner on the free end side. Each of these ribs 30 has as its particular tangential boundary, therefore in a tangential direction T, a staircase or step shape. The radially outer end of each rib 30 is connected to an outer ring 32, which surrounds inner ring 28 in radial direction R. Consequently, assembly openings 34, which are arranged rotationally symmetric relative to machine axis 2 and which in each case have a substantially trapezoidal cross section, are formed by ribs 30 and inner and outer ring 28, 32.

Each assembly opening 34 is bounded further in radial direction R by a shell-segment-shaped cover 36 of outer ring 32, which cover has an increased axial extent in comparison with inner ring 14, therefore an increased extent in a direction parallel to machine axis 2. Ribs 30 also have an extent corresponding hereto. The cross section of each shell-segment-shaped cover 36 perpendicular to machine axis 2 has the shape of a crescent or circular segment.

Support structure 16 is formed by similar, separate segments 38, one of which is shown perspectively in FIG. 4. Each segment 38 has both a section of outer ring 32 with one of the covers 36 in each case and a section of inner ring 28 and a single rib 30. All segments 38 are made as a single piece in a sintering process and are arranged in tangential direction T and attached to one another to create support structure 16, shown in FIGS. 2 and 3. Because of the use of individual segments 38, the production of an electrical machine 4 with a relatively large spatial extent is also made possible, whereby the press mold necessary for production requires only the spatial extent of segment 38 shown in FIG. 4.

One of inserts 18 of electrical machine 4 is shown perspectively in FIG. 5, whereby the number of inserts 18 of electrical machine 4 is the same as the number of assembly openings 34. Each insert 18 has a lamination stack 40 with a number of individual sheets 42, which are punched out of a soft iron sheet and stacked in radial direction R. Sheets 42 in radial direction R have a coating, by which adjacent sheets 42 are insulated electrically from one another. Lamination stack 40 has five sheet stacks 44, whereby all sheets 42 of each sheet stack 44 have the same shape and whereby sheets 42 from different sheet stacks differ. Each sheet stack 44 has the same number of sheets 42, whereby individual sheets 42 of each sheet stack 44 and sheet stacks 44 are connected to one another, for example, by soldering, welding, gluing, or punch-stacking. All sheets 42 are hereby configured substantially U-shaped, whereby the two parallel legs of the U-shape have a rear grip 46 facing the other leg. As a result, each sheet 42 has a substantially pentagonal recess. The recesses of all sheets 42 are of similar size and are aligned to one another. Consequently, lamination stack 40 has a radially extending stator slot 48, into which a radially extending slit 50 opens, which is located between the two rear grips 46, and which has a reduced extent in tangential direction T in comparison with stator slot 48.

Figure 6:
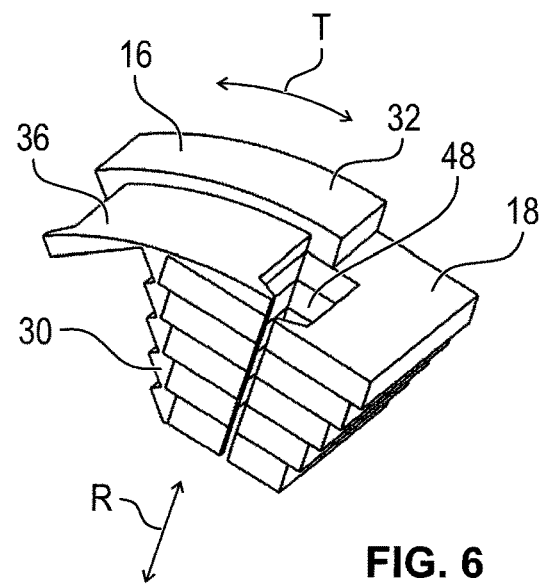
FIG. 6 shows perspectively the insert fastened to the segment.

The extent of the legs, parallel to one another, of the U-shape of sheets 42 in tangential direction T increases with an increasing distance of sheet stacks 44 to machine axis 2, whereby this occurs symmetrically with respect to the straight line defined by slit 50. As a result, lamination stack 40 is arranged axisymmetrically with respect to a straight line running in radial direction R, and the area of sheets 42 is increased with increasing distance to machine axis 2, whereby all sheets 42 of the same sheet stack 44 have the same shape and consequently the same area. Therefore, lamination stack 40 in tangential direction T has a step shape as a boundary, which in the assembled state, as shown in FIG. 6, engages in the corresponding step shape of the radially extending rib 30, provided insert 18 is inserted in one of the assembly openings 34. As a result, support structure 16 is intermeshed with insert 18, which is formed substantially by lamination stack 40, and a positive connection is created between support structure 16 under insert 18. In this case, insert 18 abuts in sections inner ring 28 and outer ring 32 as well, whereby shell-segment-shaped cover 36 covers insert 18 in radial direction R. In other words, insert 18 in radial direction R is surrounded by cover 36 and other elements of outer ring 32. Cover 36 in this case is recessed in tangential direction T, so that it aligns with stator slot 48.

Figure 7:
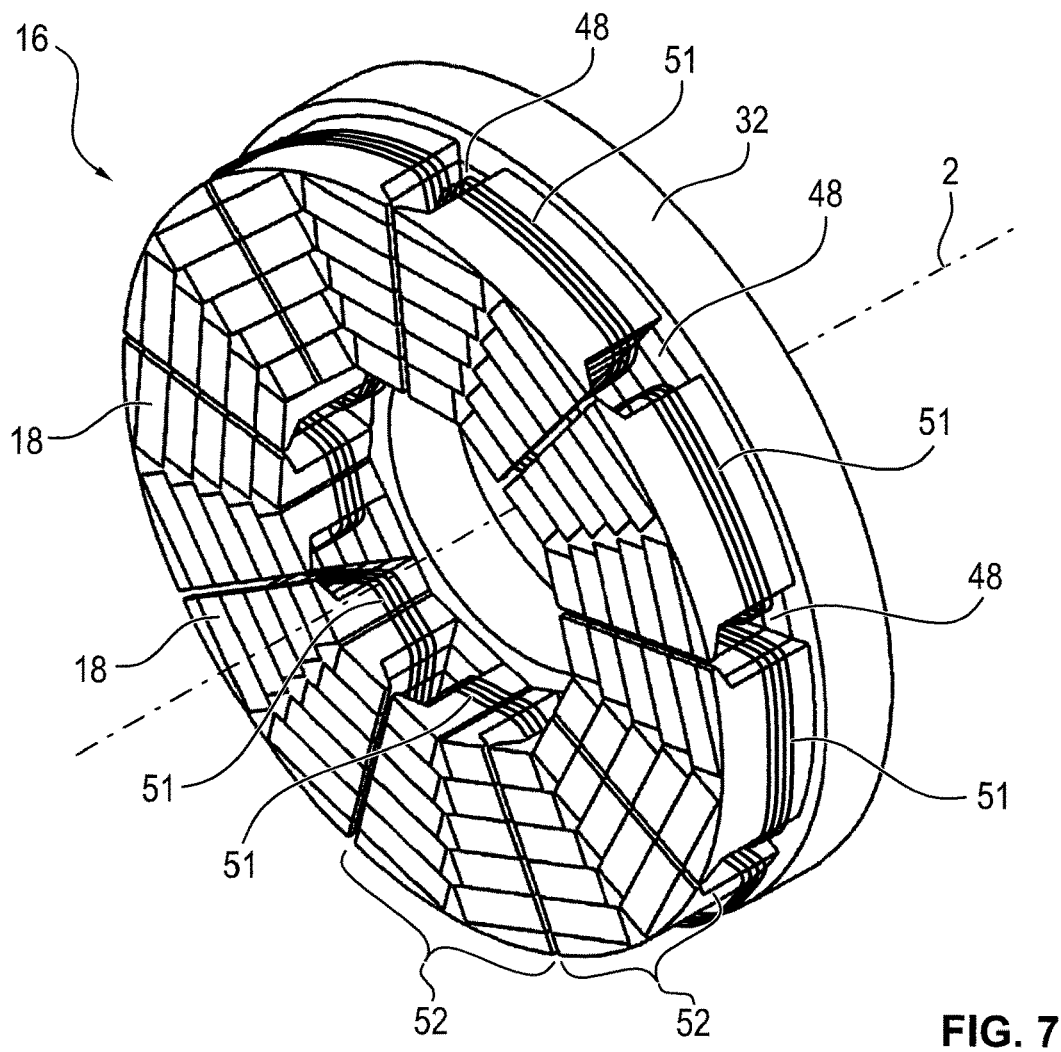
FIG. 7 shows perspectively the support structure with a number of inserts attached thereto.

The support structure with nine inserts 18, attached thereto, according to FIG. 2, is shown in FIG. 7, whereby support structure 16, created from individual segments 38, of one of inserts 18 is positioned positively in each assembly opening 34. Each of the nine similar inserts 18 abuts in sections both inner ring 28 and outer ring 32. Consequently, each insert 18 is arranged in radial direction R at least partially between inner ring 28 and outer ring 32. Inserts 18 shown in FIGS. 6 and 7 do not have section 20 projecting through support structure 16.

An associated electrical winding 51, made of an enameled copper wire, wraps around each cover 36. Each electrical winding 51 is routed through two stator slots 48, adjacent in tangential direction T, so that the axis of each electrical winding 51 is parallel to rotation axis 2 and spaced apart from it. In this case, a pole shoe 52 of the electrical machine, which consequently has nine pole shoes 52, is formed in each case with the halves, directed to one another, of adjacent inserts 18 and of rib 30, arranged between them. Each pole shoe 52 is thus associated with one electrical winding 51. In particular, each pole shoe 52 is wound with associated electrical winding 51. Covers 36 are used as a magnetic yoke and for positioning electrical winding 51, whereby because of the radially outward lateral surface of covers 36, in which sharp edges are substantially prevented, damage to electrical winding 51 during assembly is ruled out.

A variation of support structure 16 and of insert 18, which is shown in FIG. 8 according to FIG. 5, is shown in FIG. 8 according to FIG. 6. Insert 18 has two groove-shaped recesses 54 that run parallel to slit 50, whereby cover 36 has a notch 56 corresponding thereto, so that each recess 52 aligns with one of notches 56 of cover 36. The two recesses 54 are arranged axisymmetrically with respect to a straight line defined by slit 50. Due to recesses 54, a cogging torque between rotor 8 and stator 12 is reduced, so that during operation the rotor has an improved concentricity. A further embodiment of insert 18 and support structure 16 is shown in FIGS. 9A and 9B, whereby insert 18 has four radially extending recesses 54. Each cover 36 in the assembled state has notches 56 aligned with the recesses, for which reason each recess 36 comprises four such notches 56. Here as well, recesses 54 are arranged axisymmetrically with respect to radially extending slit 50, whereby the cross section of each recess 54 in radial direction R corresponds substantially to the variant shown in the preceding embodiment.

A variation of the embodiment of insert 18 and support structure 16 as shown in FIGS. 8A, 8B is illustrated in FIGS. 10A and 10B. Recesses 54 are again formed by individual sheet stacks 44, whereby the individual sections of recesses 54 are not aligned with one another, however. Consequently, the two recesses 54 are formed in the shape of steps, whereby the distance of radial recesses 54 to slit 50 increases with an increasing radial distance to machine axis 2.

Figure 11A:
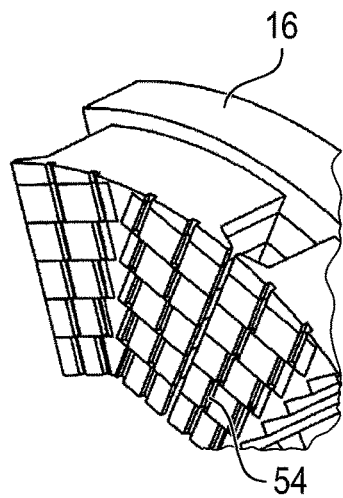
Figure 11B:
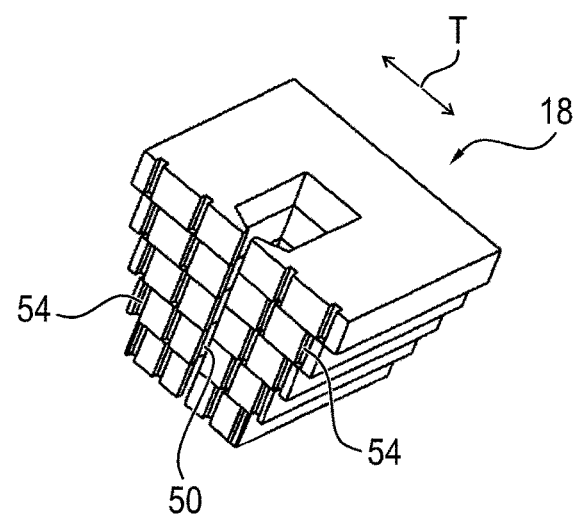

A further embodiment of support structure 16 and inserts 18 are shown in FIGS. 11A and 11B, whereby each insert 18 has four radial recesses 54, which are designed in the shape of steps in each case. In this case, in tangential direction T with respect to slit 50 two each of the groove-shaped radial recesses 54 are arranged on one of the sides of slit 50. The distance of recesses 54 to radial slit 50 in tangential direction T increases with an increasing distance to machine axis 2.

Figure 12:
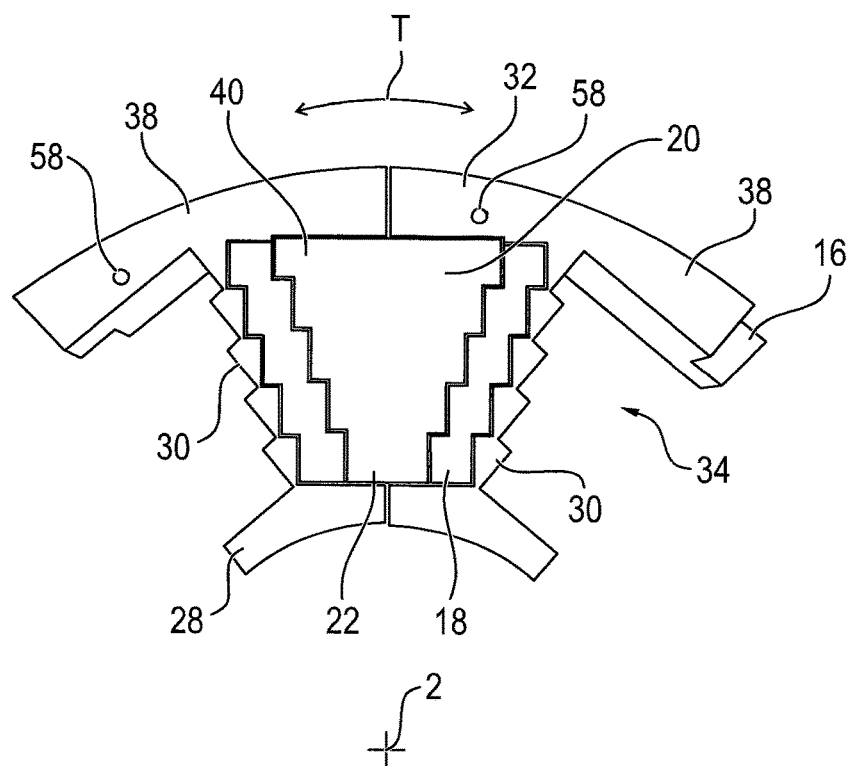
FIG. 12 shows in a plan view a further embodiment of the insert.

One of inserts 18, which has section 20, is illustrated in a plan view in FIG. 12 viewed from cooling plate 24. Insert 18 is arranged between two segments 38 of support structure 16, said segments which are arranged adjacent to one another in tangential direction T. In other words, insert 18 is located in a positive manner between two of the total of nine ribs 30 of support structure 16 and between inner ring 28 and outer ring 32 in one of assembly openings 34. Insert 18 consequently has the shape of a fir tree in a cross section perpendicular to machine axis 2. Insert 18 has section 20 which projects through support structure 16 and is configured narrowed in tangential direction T. As a result, lamination stack 40 has front side 22, which has a reduced area in comparison with assembly opening 34. The boundary of section 20 in tangential direction T is again created by means of a step or staircase shape. Section 20 is formed as a single piece with the particular sheet 42, forming further regions of lamination stack 40.

Figure 13:
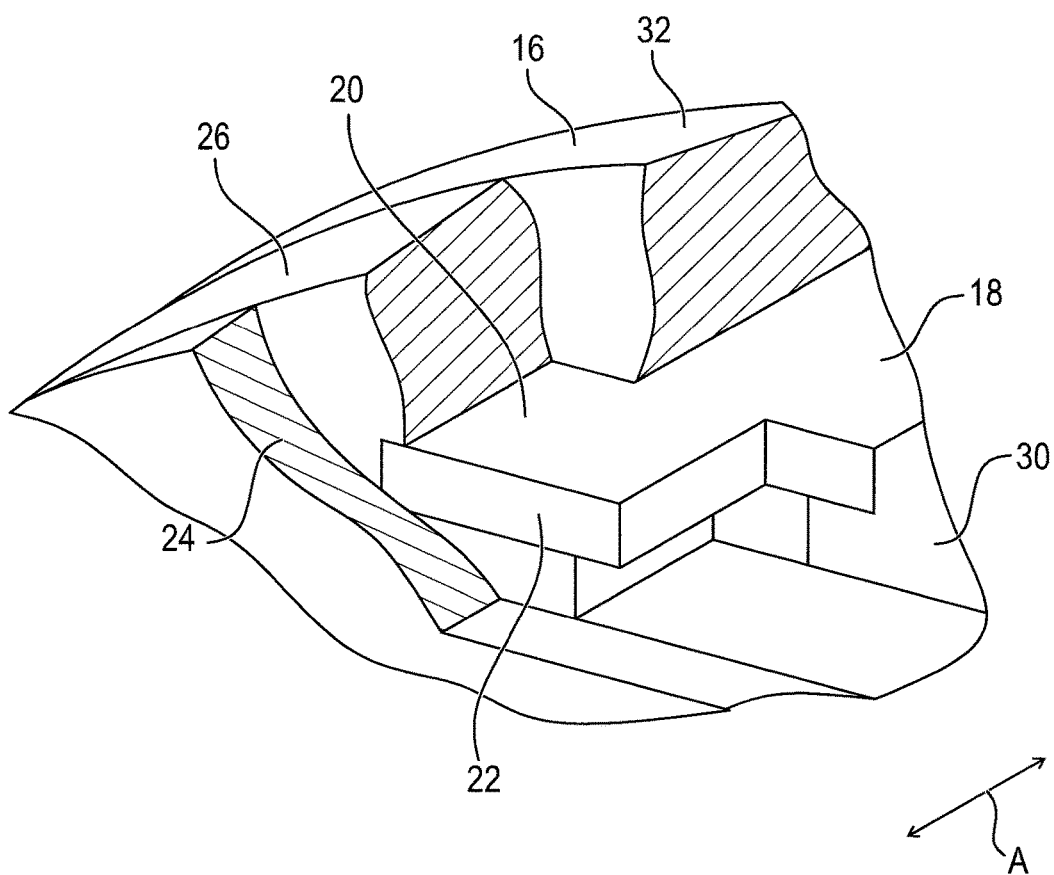
FIG. 13 shows perspectively in a sketch illustration the assembled insert according to FIG. 12.

Assembled insert 18, which projects through support structure 16 in axial direction A, is shown in FIG. 13 in a sketch illustration. Front side 22 abuts cooling plate 24 and is in thermal contact with it. As a result, the heating of lamination stack 40, which due to a current supply to electrical winding 51, is dissipated by cooling plate 24, for which reason insert 18 during operation has a substantially constant temperature. For this purpose, cooling plate 24 has cooling fins or lines for a cooling fluid (not shown). The region between support structure 16 and cooling plate 24 is filled by flange 26, which is made as a single piece with other elements of housing 6. Support structure 16 and cooling plate 24 are attached to flange 26 and other elements (not shown) of housing 6. For this purpose, flange 26 engages in bored holes 58, which extend in axial direction A, are introduced in outer ring 32, and are shown in FIG. 12. Flange 26 positively abuts section 20 of insert 18. Because of the reduced extent in tangential direction T of insert 18 in the region of section 20, flange 26 is designed as thicker in this region in comparison with ribs 30 of support structure 16, said ribs running in radial direction R, for which reason it has a relatively high structural integrity. As a result, support structure 16 is stabilized by flange 26 and movement of individual segments 38 of support structure 16 is prevented.

Figure 14:
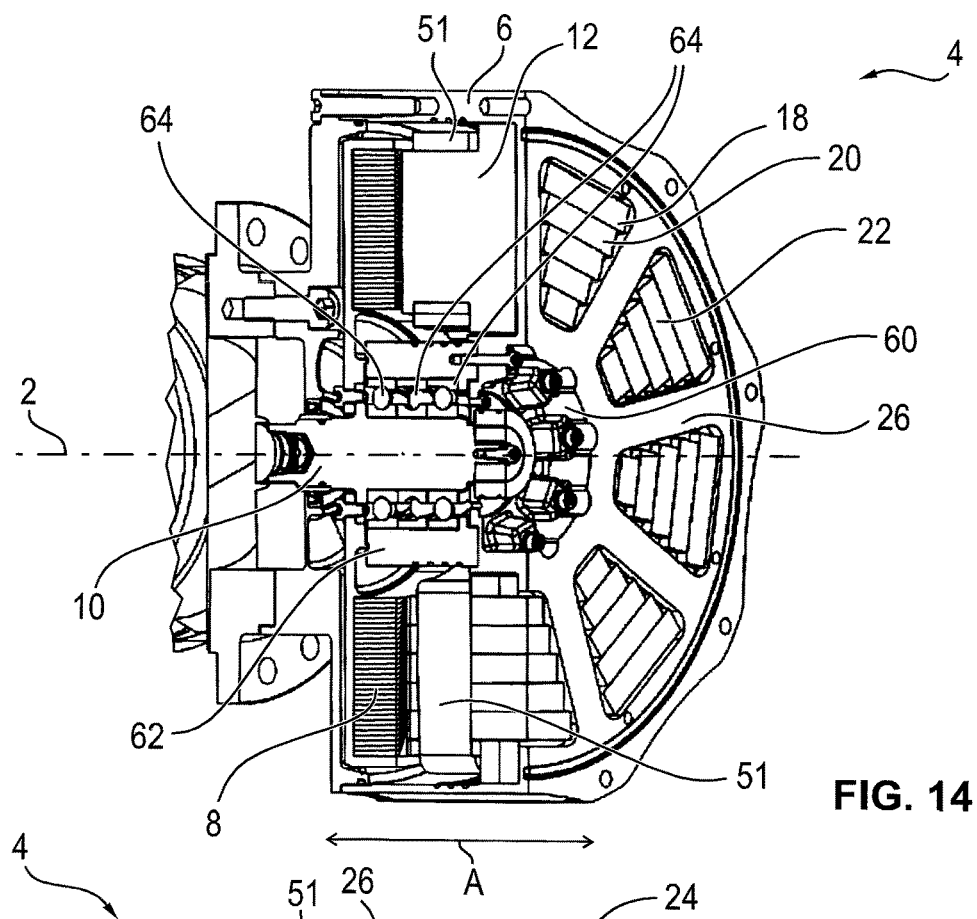
FIGS. 14 and 15 show in a sectional illustration perspectively the axial flux motor.
Figure 15:
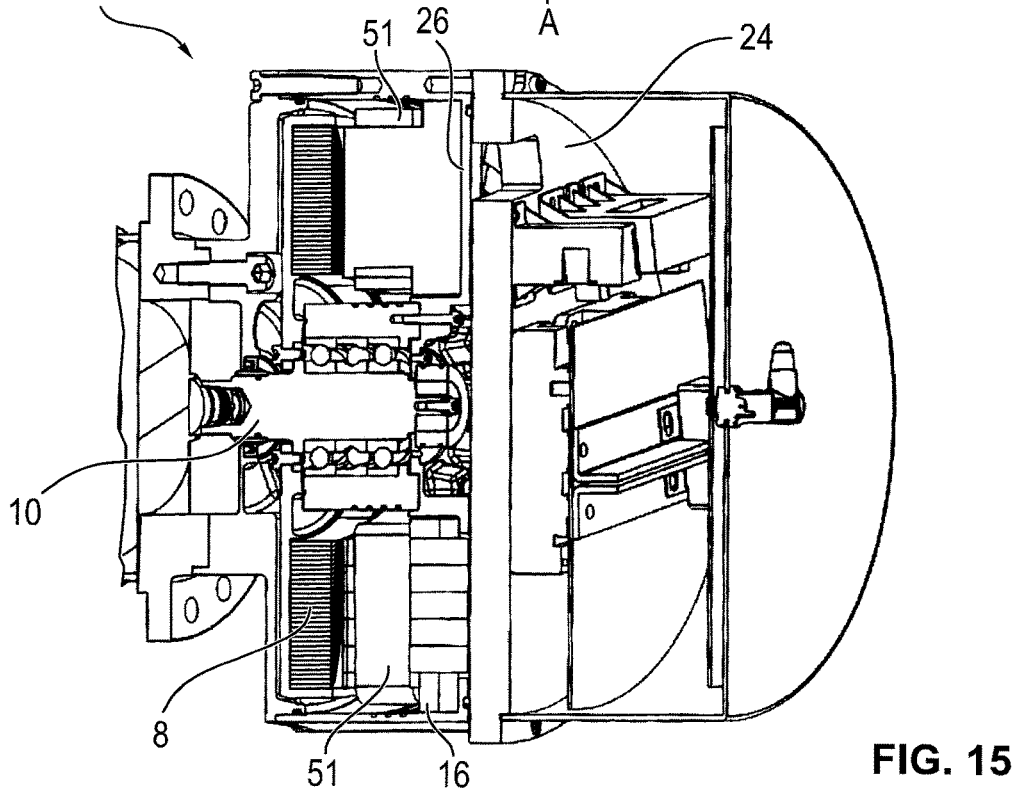

Axial flux motor 4 is shown in a sectional illustration in FIG. 14 without cooling plate 24 and in FIG. 15 with attached cooling plate 24. Flange 26 is formed star-shaped and as a single piece with other elements of pot-shaped housing 6. In the assembled state, flange 26, as shown in FIG. 15, is covered substantially totally by cooling plate 24, which is attached to housing 6 in axial direction A. Flange 26 in the center has a pot-shaped depression 60, to which a fastening structure 62, extending parallel to rotation axis 2, is attached in the form of a hollow cylinder, which is directed away from cooling plate 24. Fastening structure 62 surrounds three angular contact ball bearings 64 in radial direction R. These have a pressure angle, which is always inclined in the same direction, relative to rotation axis 2. Preferably, in this case the rotation axis of all balls of angular contact ball bearings 64 are rotationally symmetric relative to rotation axis 2. Consequently, no preloading in axial direction A is realized by angular contact ball bearings 64.

Because of the magnetic interaction of stator 12 with rotor 8, which has at least partially a force component in axial direction A, the preloading in axial direction A is realized, for which reason, on the one hand, rotor 8 is stabilized relative to stator 12. On the other hand, weight and installation space in axial direction A are reduced due to the absence of an angular contact ball bearing, which would have a pressure angle, inclined in the opposite direction, for producing the axial preloading force. Further, production costs are reduced. The use of angular contact ball bearings 64 in an axial flux motor 4, which have a pressure angle, which is always inclined in the same direction, relative to rotation axis 2, therefore by means of which purely mechanically no preloading is produced in axial direction A, is independent from the further specific embodiment of stator 12, in particular inserts 18 and/or support structure 16, which can be absent in this case. This use and an axial flux motor 4 of this kind are currently regarded rather as an independent invention.

Rotor 8 also has a lamination stack to which permanent magnets are attached (not shown). These are formed substantially in the shape of segments and act together with the trapezoidal electrical windings 51, two of which are shown in the figures, whereby the top winding is shown in a sectional illustration and the bottom winding in a side view.

The invention is not limited to the exemplary embodiments described above. Rather, other variants of the invention can also be derived herefrom by the skilled artisan, without going beyond the subject of the invention. Particularly, further all individual features described in relation to the individual exemplary embodiments can also be combined with one another in a different manner, without going beyond the subject of the invention.

What is claimed is:

1. An electrical machine, in particular an axial flux motor, comprising:
   a rotor mounted rotatably about a machine axis; and
   a stator comprising:
       a sintered support structure; and
       an insert connected to the sintered support structure, the insert forming at least partially a pole shoe and comprising a lamination stack, wherein the lamination stack comprises a plurality of sheet stacks that are stacked one on top of another in a radial direction.

2. The electrical machine according to claim 1, wherein individual sheets in each of the plurality of sheet stacks have substantially the same shape, wherein the individual sheets in each of the plurality of sheet stacks are stacked one on top of another in the radial direction or connected to one another, and wherein the sheets of different sheet stacks of the plurality of sheet stacks differ in size.

3. The electrical machine according to claim 2, wherein the sheets of the different sheet stacks are U-shaped, and/or area of the sheets of the different sheet stacks is increased with increasing distance to the machine axis, and/or the lamination stack is axisymmetric relative to a radial straight line.

4. The electrical machine according to claim 1, wherein the insert has a radially extending stator slot or a single stator slot into which a radially extending slit opens, which has a reduced tangential extent.

5. The electrical machine according to claim 1, wherein the insert has a radially extending recess, which is designed as groove-shaped, and/or wherein the insert and the sintered support structure are intermeshed.

6. The electrical machine according to claim 1, wherein the insert projects through the sintered support structure in an axial direction.

7. The electrical machine according to claim 6, wherein the insert on a front side abuts a cooling plate and/or a section projecting through the sintered support structure of the insert narrows in a tangential direction.

8. The electrical machine according to claim 1, wherein the sintered support structure has a number of separate segments, which are arranged in a tangential direction, and/or the sintered support structure is connected on a front side to a flange that is made as a single piece with a housing within which the stator is disposed.

9. The electrical machine according to claim 8, further comprising a cooling plate covering the flange.

10. The electrical machine according to claim 1, wherein the sintered support structure has an inner ring and an outer ring, which are connected by radial ribs, and wherein the insert is arranged in the radial direction at least partially between the inner ring and the outer ring.

11. The electrical machine according to claim 10, wherein the insert abuts at least in sections the inner ring and the outer ring, and/or the outer ring has a shell-segment-like cover covering the insert in the radial direction.

12. The electrical machine according to claim 10, wherein the radial ribs are in a step shape.

13. The electrical machine according to claim 1, further comprising a number of similar inserts and a number, corresponding hereto, of pole shoes, and/or by a single rotor.

14. The electrical machine according to claim 1, wherein the stator further comprises an electrical winding, wherein the insert comprises a radially extending stator slot, and wherein the electrical winding is arranged within the radially extending stator slot.

15. A stator of an electrical machine comprising:
a sintered support structure; and
an insert connected to the sintered support structure, the insert comprising:
a lamination stack, comprising:
a plurality of sheet stacks that are stacked one on top of another in a radial direction; and
a pole shoe,
wherein the insert forms a part of the pole shoe.

16. The electrical machine according to claim 15, wherein the pole shoe comprises a radial rib, a half portion of the insert and a half portion of an adjacent insert.

17. The electrical machine according to claim 16, further comprising an electrical winding wrapped around the pole shoe.

18. The electrical machine according to claim 15, wherein the sintered support structure comprises radial ribs, and wherein the insert is positioned between at least two of the radial ribs.

* * * * *